(12) United States Patent
Isaji et al.

(10) Patent No.: US 7,157,024 B2
(45) Date of Patent: Jan. 2, 2007

(54) METAL OXIDE PARTICLE AND PROCESS FOR PRODUCING SAME

(75) Inventors: Tadayuki Isaji, Sodegaura (JP); Osamu Fujimoto, Sodegaura (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 446 days.

(21) Appl. No.: 10/851,166

(22) Filed: May 24, 2004

(65) Prior Publication Data

US 2005/0012078 A1    Jan. 20, 2005

(30) Foreign Application Priority Data

May 26, 2003    (JP)    ............... 2003-147304

(51) Int. Cl.
 C01G 30/02    (2006.01)
 C01G 9/02    (2006.01)
 C23C 16/40    (2006.01)
 B32B 5/16    (2006.01)

(52) U.S. Cl. ............... 252/519.1; 252/518.1; 252/500; 252/584; 977/811; 977/814; 423/594.7; 423/87; 423/89; 423/99; 516/78; 516/91; 516/92; 516/88; 106/287.19; 428/142

(58) Field of Classification Search ............ 252/519.1, 252/500, 584; 977/811, 814; 423/87, 89, 423/99, 594.7, 594.9; 106/287.19; 516/78, 516/88, 91, 92; 428/142

See application file for complete search history.

(56) References Cited

U.S. PATENT DOCUMENTS

| 4,867,794 A | 9/1989 | Ambrosius et al. |
| 6,432,545 B1 * | 8/2002 | Schicht et al. ............. 428/432 |
| 6,626,987 B1 * | 9/2003 | Suzuki et al. .......... 106/287.14 |

FOREIGN PATENT DOCUMENTS

| EP | 0 927 700 A1 | 7/1999 |
| JP | A 10-251018 | 9/1998 |
| JP | 927700 | * 7/1999 |
| JP | A 11-189416 | 7/1999 |

* cited by examiner

*Primary Examiner*—Mark Kopec
*Assistant Examiner*—Kallambella Vijayakumar
(74) *Attorney, Agent, or Firm*—Oliff & Berridge, PLC

(57) ABSTRACT

The present invention relates to a metal oxide particle comprising tin atom, zinc atom, antimony atom and oxygen atom, having a molar ratio $SnO_2:ZnO:Sb_2O_5$ of 0.01–1.00: 0.80–1.20:1.00 and having a primary particle diameter of 5 to 500 nm; and a process for producing the metal oxide particle comprising the steps of: mixing a tin compound, a zinc compound and an antimony compound in a molar ratio $SnO_2:ZnO:Sb_2O_5$ of 0.01–1.00:0.80–1.20:1.00; and calcining the mixture at a temperature of 300 to 900° C. The metal oxide particle is used for several purposes such as antistatic agents, UV light absorbers, heat radiation absorbers or sensors for plastics or glass, etc.

17 Claims, 4 Drawing Sheets

100 nm

METAL OXIDE PARTICLE AND PROCESS FOR PRODUCING SAME

BACKGROUND OF THE INVENTION

1. Field of the Art

The present invention relates to a metal oxide particle comprising tin atom, zinc atom, antimony atom and oxygen atom, having a molar ratio $SnO_2:ZnO:Sb_2O_5$ of 0.01–1.00: 0.80–1.20:1.00 and having a primary particle diameter of 5 to 500 nm; and a process for producing the same. The metal oxide particle according to the present invention has a rutile-type structure. The metal oxide particle according to the present invention has an electrical conductivity and a heat radiation absorptivity (an infrared absorptivity) and thereby is used for several purposes such as antistatic agents, UV light absorbers, heat radiation absorbers or sensors for plastics or glass.

2. Description of the Related Art

There is described a composition comprising diantimony pentoxide and zinc oxide produced by mixing a basic zinc carbonate with an acidic aqueous sol of diantimony pentoxide in a molar ratio $ZnO/Sb_2O_5$ of 0.5–10 to form a uniform slurry, subjecting the basic zinc carbonate in the slurry to decarboxylation at a temperature of 50 to 100° C. until the molar ration of $CO_3/ZnO$ reaches 1/5 to 1/500, and drying the slurry at a temperature of 150 to 250° C. (for example, Japanese Patent Laid-open No. 3-267143).

In addition, there is also described a process for producing an anhydrous zinc antimonate having a primary particle diameter of 5 to 500 nm and an electrical conductivity of 0.1 kΩ to 1 MΩ, comprising the steps of mixing a zinc compound with a colloidal antimony oxide in a molar ratio $ZnO/Sb_2O_5$ of 0.8–1.2 and calcining the resulting mixture at a temperature of 500 to 680° C. (for example, Japanese Patent Laid-open No. 6-219743).

Further, there is described a process for producing an electrically conductive anhydrous zinc antimonate having a primary particle diameter of 5 to 100 nm, comprising the steps of mixing a zinc compound with a colloidal antimony oxide in a molar ratio $ZnO/Sb_2O_5$ of 0.8–1.2 and calcining the resulting mixture at a temperature of 300 to 680° C. in a gas containing water vapor (for example, Japanese Patent Laid-open No. 11-189416).

SUMMARY OF THE INVENTION

The present inventors found out that metal oxide particles improved in electrical conductivity and heat radiation absorptivity are produced by calcining a tin compound, a zinc compound and an antimony compound to produce oxides comprising tin atom, zinc atom, antimony atom and oxygen atom.

Thus, the present invention provides a metal oxide particle having an excellent electrical conductivity and heat radiation absorptivity by investigating the molar ration of tin, zinc and antimony, production process and the like.

The present invention includes the following aspects:

as a first aspect, a metal oxide particle comprising tin atom, zinc atom, antimony atom and oxygen atom, having a molar ratio $SnO_2:ZnO:Sb_2O_5$ of 0.01–1.00:0.80–1.20:1.00 and having a primary particle diameter of 5 to 500 nm;

as a second aspect, the metal oxide particle as set forth in the first aspect, wherein the metal oxide has a rutile-type structure, and is tin oxide-doped zinc antimonate of a formula $[(ZnO)_x(Sb_2O_5)_y]_a(SnO_2)_b$ wherein x:y=0.80–1.20:1 and a:b=1:0.01–0.30;

as a third aspect, the metal oxide particle as set forth in the first aspect, wherein the metal oxide has a rutile-type structure, and is composed of tin oxide and zinc antimonate which are represented by a formula $[(ZnO)_x(Sb_2O_5)_y]_a(SnO_2)_b$ wherein x:y=0.80–1.20:1 and a:b=1:0.30–1.00;

as a fourth aspect, a process for producing the metal oxide particle as set forth in any one of the first to third aspects comprising the steps of: mixing a tin compound, a zinc compound and an antimony compound in a molar ratio $SnO_2:ZnO:Sb_2O_5$ of 0.01–1.00:0.80–1.20:1.00; and calcining the mixture at a temperature of 300 to 900° C.;

as a fifth aspect, the process as set forth in the fourth aspect, wherein the calcination is carried out in a gas containing water vapor;

as a sixth aspect, a sol in which the metal oxide particle as set forth in any one of the first to third aspects is dispersed in an aqueous medium;

as a seventh aspect, a sol in which the metal oxide particle as set forth in any one of the first to third aspects is dispersed in an organic solvent;

as an eighth aspect, a coating composition containing the metal oxide particle as set forth in any one of the first to third aspects; and as a ninth aspect, an optical member having a cured film formed by the coating composition as set forth in the eighth aspect on a surface of an optical substrate.

The electrically conductive oxide particle of the present invention comprises tin atom, zinc atom, antimony atom and oxygen atom, has a molar ratio $SnO_2:ZnO:Sb_2O_5$ of 0.01–1.00:0.80–1.20:1.00 and has a primary particle diameter of 5 to 500 nm. The particle may be a metal oxide particle having a rutile-type structure.

The metal oxide particle is one having a primary particle diameter of 5 to 500 nm, and can afford sol having a high transparency by dispersing it in a solvent. In addition, the metal oxide particle has an electrical conductivity, and exhibits a specific resistivity of 10 to 1000 Ωcm. The metal oxide particle is stable in an aqueous solution or an organic solvent, and stable also at high temperatures. Further, the metal oxide particle according to the present invention is also characterized in that it is excellent in a heat radiation absorptivity.

As mentioned above, the metal oxide particle according to the present invention has an electrical conductivity and a heat radiation absorptivity, and thereby can be used as an antistatic agent, an electromagnetic wave shielding agent or a heat radiation absorber by applying it a plastic part, a plastic film, a plastic fiber, glass, paper or the like. In addition, it can be used as an ultraviolet and infrared absorber. Further, it can be used also as a high refractive index coating agent or an anti-reflective agent. In particular, it is effective for a transparent antistatic agent or heat radiation absorber. In addition, it can be used as a resistance element by applying it on the surface of glass or ceramics and baking.

The metal oxide particle according to the present invention can be used as a transparent antistatic agent, a coat agent having antistatic properties, a transparent electromagnetic wave shielding agent, en electrically viscous fluid or the like by mixing it with a partly hydrolyzed solution of silane coupling agent such as γ-glycidoxy propyl trimethoxy silane, γ-glycidoxy propyl methyldiethoxy silane or γ-glycidoxy propyl methyldimethoxy silane, a hydrolyzed solution of ethyl silicate or methyl silicate, a resin emulsion, an aqueous polymer solution, a solution obtained by dissolving a resin in an organic solvent, such as methyl methacrylate, a silicone oil, a coating or the like.

In addition, the metal oxide particle according to the present invention can be used as a finishing agent for metal by mixing it with water-glass, an aqueous solution of aluminum phosphate, an aqueous solution of chromate, a plating solution or the like.

Further, the oxide particle can be used also as a microfiller for composite material such as metals, plastics, ceramics or the like.

BRIEF DESCRIPTION OF THE DRWAINGS

Figure 3:
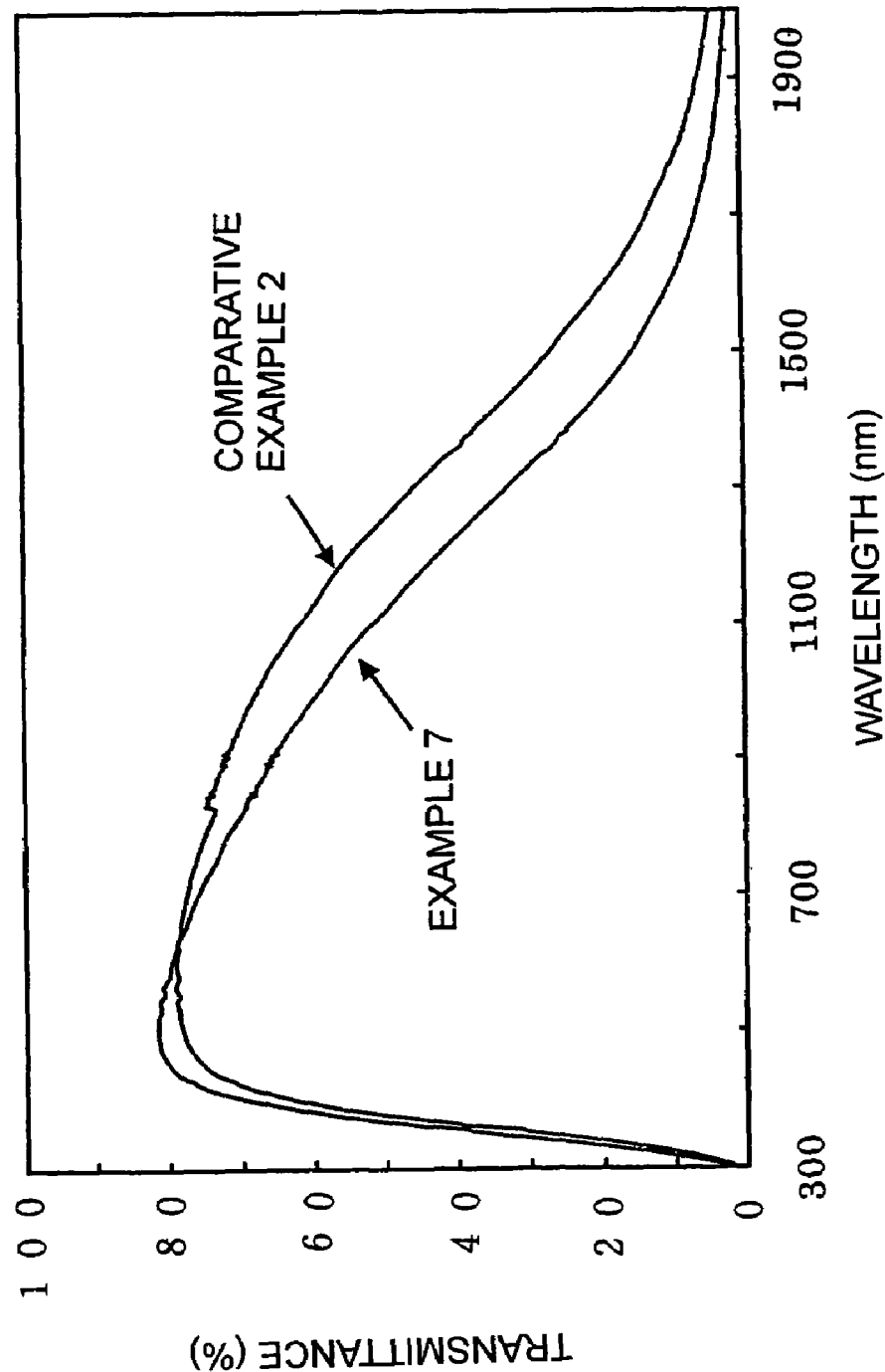
Figure 4:
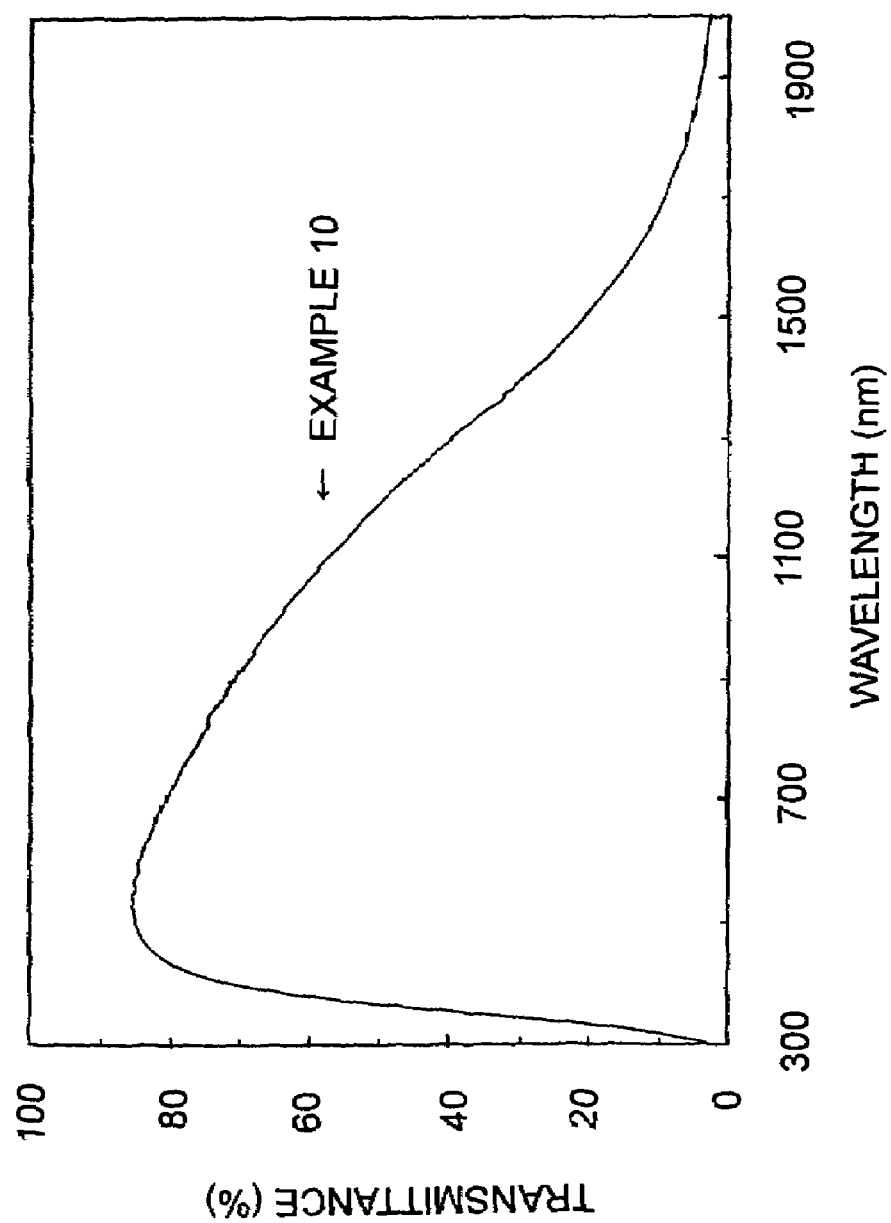

FIG. 3 is a graph showing measurement results of transmittance at wavelength of 300 to 2,000 nm with an automatic recording spectrophotometer on the glass plates on which the metal oxide particle produced in Example 7 or the zinc antimonate particle produced in Comparative Example 2 was applied; and FIG. 4 is a graph showing measurement results of transmittance at wavelength of 300 to 2,000 nm with an automatic recording spectrophotometer on the film on which the metal oxide particle produced in Example 10 was applied.

DESCRIPTION OF THE PREFERRED EMBODIMENTS

The present invention provides a metal oxide particle comprising tin atom, zinc atom, antimony atom and oxygen atom, having a molar ratio $SnO_2:ZnO:Sb_2O_5$ of 0.01–1.00: 0.80–1.20:1.00, preferably 0.02–0.10:0.80–1.20:1.00 and having a primary particle diameter of 5 to 500 nm.

In this specification, the primary particle diameter does not mean a diameter of the metal oxide particle in a aggregated state but a diameter of one metal oxide particle separated individually.

The metal oxide particle can be produced according to a process comprising the steps of: mixing a tin compound, a zinc compound and an antimony compound in a molar ratio $SnO_2:ZnO:Sb_2O_5$ of 0.01 –1.00:0.80 –1.20:1.00; and calcining the mixture in the atmosphere, several gases or a gas containing water vapor at a temperature of 300 to 900° C. after drying.

The tin compound used in the present invention is preferably one or more selected from the group consisting of oxides of tin, inorganic acid salts of tin, organic acid salts of tin and stannates. The oxides of tin include tin (II) oxide, tin (IV) oxide, metastannic acid and the like. The inorganic acid salts of tin include tin (II) chloride, tin (IV) chloride, tin (II) sulfate and the like. The organic acid salts of tin include tin oxalate, tin octylate and the like. The stannates include potassium stannate, sodium stannate and the like. These tin compounds may be commercially available ones in technical grades. In case where salts of tin are used, salts with acid liable to be volatized by calcination, that is carbonates and organic acid salts are preferable, and these compounds may be used alone or in a mixture thereof. Further, these tin compounds may be used in a solution prepared by dispersing or dissolving them in an aqueous solution or an organic solvent, or in a powder state.

The zinc compound used in the present invention is one or more selected from the group consisting of hydroxides of zinc, oxides of zinc, inorganic acid salts of zinc and organic acid salts of zinc. The hydroxides of zinc include zinc hydroxide, and the oxides of zinc include zinc oxide. The inorganic acid salts of zinc include zinc carbonate, basic zinc carbonate, zinc nitrate, zinc chloride, zinc sulfate and the like. In addition, the organic acid salts of zinc include zinc formate, zinc acetate, zinc oxalate and the like. These zinc compounds may be commercially available ones in technical grades. In case where zinc hydroxides or zinc oxides are used, they preferably have a primary particle diameter of 100 nm or less. In case where salts of zinc are used, salts with acid liable to be volatized by calcination, that is carbonates and organic acid salts are preferable, and these compounds may be used alone or in a mixture thereof. These zinc compounds may be used in a solution prepared by dispersing or dissolving them in an aqueous solution or an organic solvent, or in a powder state.

The antimony compound used in the present invention is preferably colloidal antimony oxides having a primary particle diameter of 100 nm or less, and include diantimony pentoxide sol, hexa-antimony tridecaoxide sol, hydrated diantimony tetraoxide sol, colloidal diantimony trioxide sol and the like.

Diantimony pentoxide sol can be produced by known processes, for example a process comprising oxidizing diantimony trioxide (Japanese Patent Publication No. 57-11848), a process comprising subjecting an alkali antimonate to alkali ion extraction with an ion exchange resin (U.S. Pat. No. 4,110,247), a process comprising treating a sodium antimonate with an acid (Japanese Patent Laid-open Nos. 60-41536 and 62-182116) and so on. Hexa-antimony tridecaoxide sol can be produced by a process comprising oxidizing diantimony trioxide (Japanese Patent Publication No. 62-125849), and hydrated diantimony tetraoxide sol can be also produced by a process comprising oxidizing diantimony trioxide (Japanese Patent Laid-open No. 52-21298). Colloidal diantimony trioxide can be produced by a gas phase method (Japanese Patent Laid-open No. 61-3292).

The antimony oxide sol used in the present invention has a primary particle diameter of 2 to 100 nm, preferably 2 to 50 nm, and an acidic sol containing no base such as amines or alkaline metals is particularly preferable. The antimony oxide sol may be used in antimony oxide ($Sb_2O_5$, $Sb_6O_{13}$ or $Sb_2O_4$) concentration of 1 to 60% by weight, and may be used in a dried form manufactured by drying the antimony oxide sol with spray drying, vacuum drying or freeze-drying. The above-mentioned colloidal antimony oxide may be commercially available ones in technical grades in a shape of diantimony pentoxide sol, diantimony pentoxide powder or super fine diantimony trioxide powder.

When antimony oxide used as raw material is converted into a metal oxide particle by calcining it with a tin compound and a zinc compound, a little change in the particle diameter thereof occurs. Therefore, the particle diameter of antimony oxide can be selected from broader region than that of the products.

In case where a diantimony pentoxide sol is used as raw material, for example ZnO-doped diantimony pentoxide sol produced by dispersing diantimony trioxide and a basic zinc carbonate in water in a $ZnO/Sb_2O_3$ molar ratio of 0.01 to 0.2 and reacting with hydrogen peroxide can be used as raw material. In this case, doped ZnO is included in the molar ratio of the finally obtained metal oxide particle.

The mixing of the tin compound and the zinc compound with the antimony oxide sol can be carried out by using an apparatus such as Satake agitator, Pfaudler agitator or a disperser at a mixing temperature of 0 to 100° C. for a mixing time of 0.1 to 30 hours. The mixing of the tin compound and zinc compound with a dried material of antimony oxide sol or a colloidal diantimony trioxide can be carried out with an apparatus such as a mortar, a twin shaft mixer, Henschel mixer or a ball mill.

In the present invention, an aqueous slurry comprising tin compound, zinc compound and antimony compound in a molar ratio $SnO_2:ZnO:Sb_2O_5$ of 0.01–1.00:0.80–1.20:1.00 is formed and then the slurry is dried and calcined at a predetermined temperature.

The slurry is preferably formed by for example mixing the tin compound and the zinc compound with the antimony oxide sol or the dried material thereof or the colloidal diantimony trioxide. In the present invention, the drying of the mixture (slurry) of tin compound and zinc compound with antimony oxide sol can be carried out with a spray dryer, a drum dryer, a box type hot-air dryer, a vacuum dryer, a freeze dryer or the like. In the meantime, the drying temperature is not specifically limited, but is preferably 300° C. or less from the standpoint of an apparatus to be used or operation thereof. In addition, the slurry is separated through filtration with suction, centrifugal filtration, filter press or the like, and in some cases, soluble impurities in the raw material are removed with water-pouring wash to obtain a wet cake, and then the cake can be dried with the above-mentioned dryer, etc.

When an aqueous slurry comprising antimony compound, tin compound and zinc compound is produced in the present invention, there are cases where the tin compound is lower in solubility than the zinc compound. For example, in case where a diantimony pentoxide sol, a metastannic acid and a basic zinc carbonate are used as raw material, a homogeneous slurry can be obtained by adding the metastannic acid in the diantimony pentoxide sol by making use of ion exchange efficiency of the diantimony pentoxide, and then adding the basic zinc carbonate thereto to an aqueous slurry.

An aqueous hydrogen peroxide and an organic acid can be added in the slurry in order to accelerate a reaction of the antimony compound, tin compound and zinc compound therein. This can afford a more homogeneous slurry. Consequently, as a lowering in the temperature of calcination is attained, particle growth is inhibited, and the improvement in transparency, electrical conductivity and heat radiation absorptivity of a coat liquid containing the metal oxide particle having electrical conductivity and heat radiation absorptivity is attained. The amount of hydrogen peroxide is not specifically limited, but is generally used in $H_2O_2/Sb_2O_5$ molar ration of 0.1 to 10.

As the above-mentioned organic acid, one containing a small number of carbon atoms is used from the viewpoint of solubility to an aqueous medium. For example, organic acids such as formic acid, acetic acid or propionic acid are preferably used. The organic acids are added in organic acid/$Sb_2O_5$ molar ration of 0.005 to 0.5.

In the present invention, the dried material of mixture of tin compound and zinc compound with antimony oxide sol or the mixture of tin compound and zinc compound with a dried material of antimony oxide sol or a colloidal diantimony trioxide is calcined in the atmosphere, several gases or a gas containing water vapor at a temperature of 300 to 900° C., preferably at a temperature of 400 to 600° C. for 0.5 to 50 hours, preferably 2 to 10 hours. This calcination affords metal oxide particles having a rutile-type structure by a reaction of tin oxide, zinc oxide and antimony oxide according to solid phase reaction.

The calcination can be carried out in the atmosphere, and can be carried out in a flow of several gases or a gas containing water vapor.

As several gases, an oxidizing gas, a reducing gas and an inert gas can be used. The oxidizing gas includes for example oxygen, air, a mixed gas of nitrogen and oxygen. The reducing gas includes hydrogen, carbon monoxide, a mixed gas of hydrogen and nitrogen and the like. The inert gas includes nitrogen, carbonic acid gas, helium, argon and the like.

In case where a gas containing water vapor is used in the calcination, the mixing of water vapor is carried out at a temperature of 100° C. or more for preventing the formation of any condensation. As gas to which water vapor is added, an oxidizing gas, a reducing gas and an inert gas can be used. The oxidizing gas includes for example oxygen, air, a mixed gas of nitrogen and oxygen. The reducing gas includes hydrogen, carbon monoxide, a mixed gas of hydrogen and nitrogen and the like. The inert gas includes nitrogen, carbonic acid gas, helium, argon and the like. Among them, it is preferable to use air and nitrogen.

The partial pressure ratio of water vapor and gas is 0.05 to 2.0, preferably 0.1 to 1.0 in terms of (partial pressure of water vapor)/(partial pressure of gas). The control of the partial pressure ratio between gas and water vapor is carried out by a method in which a gas is bubbled into a warmed bath and the partial pressure of water vapor is controlled based on the temperature of the warmed bath, or a method in which the partial pressure ratio of gas and water vapor is controlled by directly mixing the gas and the water vapor at a temperature of 100° C. or more.

The present invention leads to a lowering in calcination temperature by calcining in a gas containing water vapor. Consequently, particle growth is inhibited, and the improvement in transparency, electrical conductivity and heat radiation absorptivity of a coat liquid containing the metal oxide particle having electrical conductivity and heat radiation absorptivity is attained.

The metal oxide particle according to the present invention shows green to deep blue color. It is confirmed that the metal oxide particle obtained according to the process of the present invention has a rutile-type structure from X-ray diffraction peak.

The metal oxide particle has a rutile-type structure and is tin oxide-doped zinc antimonate of a formula

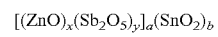

wherein x:y=0.80–1.20:1 and a:b=1:0.01–0.30.

In addition, the metal oxide particle has a rutile-type structure, and is composed of tin oxide and zinc antimonate which are represented by a formula

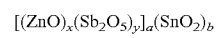

wherein x:y=0.80–1.20:1 and a:b=1:0.30–1.00.

Further, the metal oxide particle according to the present invention is confirmed from the observation with transmission electron microscope to have a primary particle diameter of 5 to 500 nm, preferably 5 to 300 nm, more preferably 5 to 50 nm and to be a fine particle at a colloidal level.

And, the metal oxide particle according to the present invention is confirmed to have a specific resistance of 10 to 1000 Ωcm when it is pressed at 300 kg/cm². Therefore, the metal oxide particle is confirmed that it is an electrically conductive oxide particle having a good conduction of electricity.

The metal oxide particle manufactured according to the present invention can afford an aqueous sol or an organic solvent sol easily by wet-grinding it in water or an organic solvent with a sand grinder, a ball mill, a homogenizer, a disperser, a colloid mill, an ultrasonic homogenizer, a high-pressure homogenizer or the like.

In the present invention, an aqueous sol containing metal oxide particle in higher purity can be optionally provided by contacting an aqueous sol of the resulting metal oxide particle with an ion exchange resin to remove impurity ions.

In case where a sol of water or an organic solvent is produced by wet-grinding the metal oxide particle according to the present invention, the sol can be optionally stabilized with addition of ammonia, hydroxides of alkali metal, ketones such as acetone, methyl ethyl ketone or diacetone alcohol, β-diketones such as acetyl acetone or acetonyl acetone, esters such as acetoacetic acid ester, lactic acid ester, 2-methoxyethyl acetate or 2-ethoxyethyl acetate, ethers such as methyl cellosolve, ethyl cellosolve, butyl cellosolve or propylene glycol monomethyl ether, heterocyclic compounds such as furfuryl alcohol, tetrahydro furfuryl alcohol, N-methylpyrrolidone, inorganic acids such as hydrochloric acid or nitric acid, oxycarboxylic acids such as lactic acid, tartaric acid, malic acid or citric acid.

In the present invention, an organic solvent sol can be obtained by replacing the medium of an aqueous sol of the metal oxide particle with the above-mentioned organic solvent. Even after replacing medium with the organic solvent, the particle diameter of the metal oxide particle in the organic solvent is almost identical to that of the metal oxide particle in the aqueous sol.

As the organic solvent, the followings can be used: alcohols such as methyl alcohol, ethyl alcohol, propyl alcohol, 2-propyl alcohol or butyl alcohol, glycols such as ethylene glycol, diethylene glycol or hexylene glycol, ethers such as methyl cellosolve or ethyl cellosolve, ketones such as methyl ethyl ketone, hydrocarbons such as xylene or toluene.

When the sol of the metal oxide particle is produced by using high boiling point solvents such as 2-propyl alcohol, ethylene glycol, methyl ethyl ketone or toluene as dispersion medium, it is preferable to replace the solvent of the sol prepared by using methanol as dispersion medium with a high boiling point solvent.

In addition, when the sol of the metal oxide particle is produced by using ketones such as methyl ethyl ketone, or aromatic hydrocarbons such as toluene, a high boiling point solvent sol with high dispersion properties can be obtained by adding relatively high boiling point solvents such as 2-propyl alcohol to form a mixed solvent system.

Further, by applying ultrasonic wave to the high boiling point solvent sol, the sol in which the metal oxide particle is highly dispersed can be obtained. The application of ultrasonic wave can be carried out by putting a container in which the sol is placed in an ultrasonic wave generator.

The metal oxide particle according to the present invention or the sol containing the same can be used as a transparent antistatic agent, a coat agent having antistatic properties, a transparent electromagnetic wave shielding agent, an electrically viscous fluid or the like by mixing it with silicon compounds, methacrylates polymerizable with activated energy radiation, resin emulsions, water soluble polymer solutions, silicone oil, coatings or the like to produce a coating composition.

The silicon compounds include for example the following Component A and/or Component B:

Component A: the organic silicon compounds of formula (I) and the hydrolyzed products thereof:

$(R^1)_a(R^3)_b Si(OR^2)_{4-(a+b)}$ (I)

wherein $R^1$ and $R^3$ are independently an organic group selected from the group consisting of alkyl groups, alkenyl groups, aryl groups, acyl groups, halogen atoms, glycidoxy groups, epoxy groups, amino groups, phenyl groups, mercapto groups, methacryloxy groups and cyano groups, $R^2$ is an organic group selected from the group consisting of alkyl groups having 1 to 8 carbon atoms, alkoxy groups, acyl groups and phenyl groups, and a and b are an integer of 0 or 1; and Component B: the organic silicon compounds of formula (II) and the hydrolyzed products thereof:

$[(OX)_{3-a}Si(R^4)]_2Y$ (II)

wherein $R^4$ is an organic group having 1 to 5 carbon atoms,

X is an alkyl group having 1 to 4 carbon atoms or an acyl group having 1 to 4 carbon atoms, Y is an organic group having 2 to 20 carbon atoms, and a is an integer of 0 or 1.

Component A is represented by formula (I), and concrete examples of the organic silicon compounds and the hydrolyzed products thereof include methyl silicate, ethyl silicate, n-propyl silicate, iso-propyl silicate, n-butyl silicate, tetraacetoxy silane, methyl trimethoxy silane, methyl tripropoxy silane, methyl triacetoxy silane, methyl tributoxy silane, methyl triamiroxy silane, methyl triphenoxy silane, methyl tribenzyloxy silane, methyl triphenethyloxy silane, glycidoxy methyl trimethoxy silane, glycidoxy methyl trimethoxy silane, α-glycidoxy ethyl trimethoxy silane, α-glycidoxy triethoxy silane, β-glycidoxy trimethoxy silane, β-glycidoxy ethyl triethoxy silane, α-glycidoxy propyl trimethoxy silane, α-glycidoxy propyl triethoxy silane, β-glycidoxy propyl trimethoxy silane, β-glycidoxy propyl triethoxy silane, γ-glycidoxy propyl trimethoxy silane, γ-glycidoxy propyl triethoxy silane, γ-glycidoxy propyl tripropoxy silane, γ-glycidoxy propyl tributoxy silane, γ-glycidoxy propyl triphenoxy silane, α-glycidoxy butyl trimethoxy silane, α-glycidoxy butyl triethoxy silane, β-glycidoxy butyl triethoxy silane, γ-glycidoxy butyl trimethoxy silane, γ-glycidoxy butyl triethoxy silane, δ-glycidoxy butyl trimethoxy silane, δ-glycidoxy butyl triethoxy silane, (3,4-epoxycyclohexyl) methyl trimethoxy silane, (3,4-epoxycyclohexyl) methyl triethoxy silane, β-(3,4-epoxycyclohexyl) ethyl trimethoxy silane, β-(3,4-epoxycyclohexyl) ethyl triethoxy silane, β-(3,4-epoxycyclohexyl) ethyl tripropoxy silane, β-(3,4-epoxycyclohexyl) ethyl tributoxy silane, β-(3,4-epoxycyclohexyl) ethyl triphenoxy silane, γ-(3,4-epoxycyclohexyl) propyl trimethoxy silane, γ-(3,4-epoxycyclohexyl) propyl triethoxy silane, δ-(3,4-epoxycyclohexyl) butyl trimethoxy silane, δ-(3,4-epoxycyclohexyl) butyl triethoxy silane, glycidoxy methyl methyl dimethoxy silane, glycidoxy methyl methyl diethoxy silane, α-glycidoxy ethyl methyl dimethoxy silane, α-glycidoxy ethyl methyl diethoxy silane, β-glycidoxy ethyl methyl dimethoxy silane, β-glycidoxy ethyl ethyl dimethoxy silane, α-glycidoxy propyl methyl dimethoxy silane, α-glycidoxy propyl methyl diethoxy silane, β-glycidoxy propyl methyl dimethoxy silane, β-glycidoxy propyl ethyl dimethoxy silane, γ-glycidoxy propyl methyl dimethoxy silane, γ-glycidoxy propyl methyl diethoxy silane, γ-glycidoxy propyl methyl dipropoxy silane, γ-glycidoxy propyl methyl dibutoxy silane, γ-glycidoxy propyl methyl diphenoxy silane, γ-glycidoxy propyl ethyl diethoxy silane, γ-glycidoxy propyl ethyl diethoxy silane, γ-glycidoxy propyl vinyl methoxy silane, γ-glycidoxy propyl vinyl ethoxy silane, γ-glycidoxy propyl vinyl phenyl methoxy silane, γ-glycidoxy propyl vinyl phenyl ethoxy silane, ethyl trimethoxy silane, ethyl triethoxy silane, vinyl trimethoxy silane, vinyl triacetoxy silane, vinyl trimethoxy ethoxy silane, phenyl trimethoxy silane, phenyl triethoxy silane, phenyl triacetoxy silane, γ-chloro propyl trimethoxy silane, γ-chloro propyl triethoxy silane, γ-chloro propyl triactoxy silane, 3,3,3-trifluoro propyl trimethoxy silane, γ-methacryloxy propyl trimethoxy silane, γ-mercapto propyl triethoxy silane, γ-mercapto propyl triethoxy silane, β-cyano ethyl triethoxy silane, chloro methyl trimethoxy silane, chloro methyl triethoxy silane, N-(β-aminoethyl) γ-aminopropyl trimethoxy silane, N-(β-aminoethyl) γ-aminopropyl methyl dimethoxy silane, γ-aminopropyl methyl trimethoxy silane, N-(β-aminoethyl) γ-aminopropyl triethoxy silane, N-(γ-aminoethyl) γ-aminopropyl methyl diethoxy silane, dimethyl dimethoxy silane, phenyl methyl dimethoxy silane, dimethyl diethoxy silane, phenyl methyl diethoxy silane, γ-chloro propyl methyl dimethoxy silane, γ-chloro propyl methyl diethoxy silane, dimethyl diacetoxy silane, γ-methacryloxy propyl methyl dimethoxy silane, γ-methacryloxy propyl methyl diethoxy silane, γ-mercapto propyl methyl dimethoxy silane, γ-mercapto methyl diethoxy silane, methyl vinyl dimethoxy silane, methyl vinyl diethoxy silane, etc., and the hydrolyzed products thereof.

Next, Component B is described. Component B is represented by formula (II), and concrete examples of the organic silicon compounds and the hydrolyzed products thereof include methylene bismethyl dimethoxy silane, ethylene bisethyl dimethoxy silane, propylene bisethyl diethoxy silane, butylene bismethyl diethoxy silane, etc., and the hydrolyzed products thereof.

As to the organic silicon compounds of Components A and B, only Component A or B may be used alone, or they may be used in a mixture of Components A and B. In the meanwhile, it is natural that Components A may be used in a mixture of two or more kinds of them, and Component B may be used in a mixture similarly.

Hydrolysis of the organic silicon compounds of Components A and B is carried out by adding an acidic aqueous solution such as an aqueous solution of hydrochloric acid, sulfuric acid or acetic acid in the organic silicon compounds of Components A and B and then stirring.

The methacrylates polymerizable with activated energy radiation may be arbitrarily selected from methacrylates which have one or more methacryloyl groups in the molecule and are curable with ultraviolet light or electron beam, and they may be used alone or in a mixture thereof. The concrete examples of the methacrylates include 2-hydroxyethyl methacrylate, 2-hydroxypropyl methacrylate, isobutyl methacrylate, t-butyl methacrylate, isobutyl methacrylate, 2-ethylhexyl methacrylate, stearyl acrylate, 2-ethylhexyl carbitol acrylate, ω-carboxy polycaprolactone monoacrylate, acryloyl oxyethyl acid, acrylic acid dimer, lauryl methacrylate, 2-methoxyethyl acrylate, butoxyethyl acrylate, ethoxy ethoxyethyl acrylate, methoxy triethylene glycol acrylate, methoxy polyethylene glycol acrylate, stearyl methacrylate, cyclohexyl methacrylate, tetrahydrofurfuryl methacrylate, N-vinyl-2-pyrrolidone, isobonyl methacrylate, dicyclopentenyl acrylate, benzyl acrylate, phenyl glycidylether epoxy acrylate, phenoxyethyl methacrylate, phenoxy polyethylene glycol acrylate, nonylphenol ethoxylated acrylate, acryloyoxyethyl phthalic acid, tribromophenyl acrylate, tribromophenol ethoxylated methacrylate, methyl methacrylate, tribromophenyl methacrylate, methacryloyloxy ethyl acid, methacryloyloxyethyl maleic acid, methacryloyloxyethyl phthalic acid, polyethylene glycol methacrylate, polypropylene glycol methacrylate, β-carboxyethyl acrylate, N-methylol acrylamide, N-methoxymethyl acrylamide, N-ethoxymethyl acrylamide, N-n-butoxymethyl acrylamide, t-butylacrylamide sulfonic acid, vinyl stearate, N-methylacrylamide, N-dimethylacrylamide, N-dimethylaminoethyl methacrylate, N-dimethylaminopropyl acrylamide, acryloyl morpholine, glycidyl methacrylate, n-butyl methacrylate, ethyl methacrylate, allyl methacrylate, cetyl methacrylate, pentadecyl methacrylate, methoxy polyethylene glycol methacrylate, diethyl aminoethyl methacrylate, methacryloyloxyethyl succinate, hexane diol diacrylate, neopentyl glycol diacrylate, triethylene glycol diacrylate, polyethylene glycol diacrylate, poly-propylene glycol diacrylate, neopentyl hydroxypivalic acid ester, pentaerythritol diacrylate monostearate, glycol diacrylate, 2-hydroxyethyl methacryloyl phosphate, bisphenol A ethylene glycol adduct acrylate, bisphenol F ethylene glycol adduct acrylate, tricyclodecane methanol diacrylate, trishydroxyethyl isocyanurate diacrylate, 2-hydroxy-1-acryloxy-3-methacryloxy propane, trimethylol propane triacrylate, trimethylol propane ethylene glycol adduct triacrylate, trimethylol propane propylene glycol adduct triacrylate, pentaerythritol triacrylate, trisacryloyloxy ethyl phosphate, trishydroxy ethyl isocyanurate triacrylate, modified ε-caprolactone triacrylate, trimethylol propane ethoxy triacrylate, glycerin propylene glycol adduct trisacrylate, pentaerythritol tetra-acrylate, pentaerythritol ethylene glycol adduct tetra-acrylate, ditrimethylol propane tetra-acrylate, dipentaerythritol hexapenta-acrylate, dipentaerythritol monohydroxy penta-acrylate, urethane acrylate, epoxidized acrylate, polyester acrylate, unsaturated polyester and the like, and the present invention is not limited to them. They may be used alone or in an arbitrary mixture thereof, but a polyfunctional methacrylate monomer or an oligomer which contains two or more methacryloyl groups in the molecule is preferable and suitable as the coating film after polymerization is hard and excellent in mar-proof properties.

EXAMPLES

Production Example 1

Production of Diantimony Pentoxide Sol as Raw Material

First 100.0 kg of diantimony trioxide (manufactured by Guangdong Mikuni Antimony Industries Co., Ltd.; 99.9 wt %) and 0.767 kg of basic zinc carbonate (manufactured by Sakai Chemical Industry Co., Ltd.; $3ZnCO_3 \cdot 4Zn(OH)_2$, 72.7 wt % as calculated as ZnO) were dispersed in 1243 kg of water and then 133.2 kg of 35% hydrogen peroxide solution and 0.788 kg of 87% formic acid were added therein, warmed to 90 to 100° C., and reacted for 2 hours to obtain a diantimony pentoxide sol. The resulting sol had $Sb_2O_5$ concentration of 14.1 wt %.

Example 1

Figure 1:
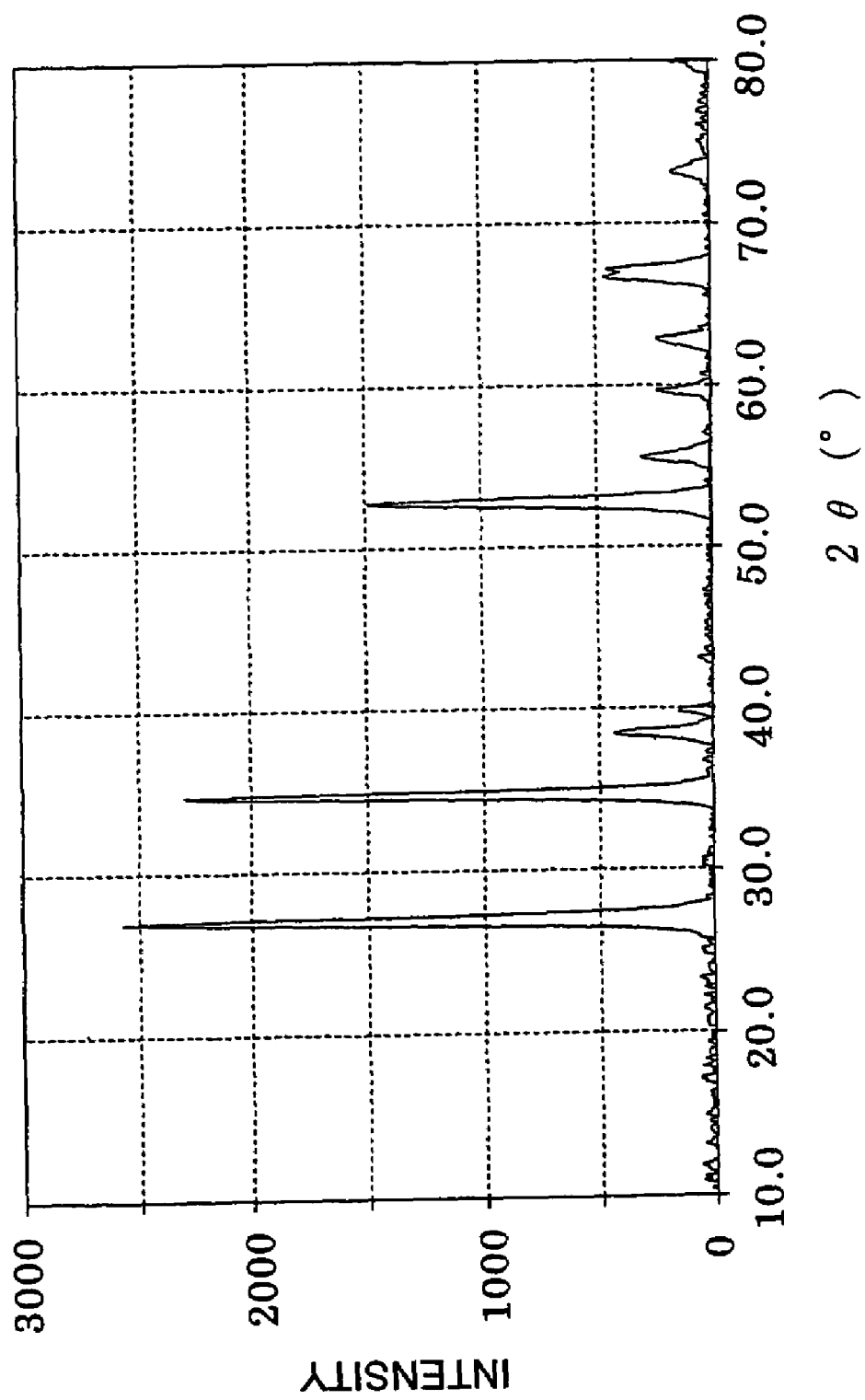
FIG. 1 is a powder X-ray diffraction pattern of the metal oxide particle produced in Example 1.
Figure 2:
FIG. 2 is a transmission electron microscope photograph showing particle structure of the metal oxide particle produced in Example 1 in which magnification is 200,000 times.

Metatinnic acid (manufactured by Showa Chemical Industry Co., Ltd.; 85.6 wt % as calculated as $SnO_2$) was added to 1141 g of diantimony pentoxide sol produced in Production Example 1 under stirring, 48.3 g of 35% hydrogen peroxide solution and 0.5 g of formic acid were added after stirring for 1 hour, and then basic zinc carbonate (manufactured by Sakai Chemical Industry Co., Ltd.; $3ZnCO_3 \cdot 4Zn(OH)_2$, 71.1 wt % as calculated as ZnO) was added, and thereafter stirred for 4 hours to obtain a slurry. The slurry had a molar ratio $SnO_2:ZnO:Sb_2O_5$ of 0.05:0.97:1.00 when it was fed. The slurry was dried at 110° C. in a dryer to obtain 216 g of powder. 5 g of the dried powder was fed into 30 mmϕ×600 mm glass tube for calcination, and calcined at 500° C. for 4 hours by providing a mixed gas with water vapor/air partial pressure ratio of 0.47 prepared by bubbling air in a flow rate of 0.6 liter/minute in a warm bath at 80° C. The resulting powder showed dark blue color and was considered to have a rutile-type structure from the results of X-ray diffraction measurements (FIG. 1). The calcined powder had a specific surface area of 46.8 m²/g, a particle diameter of 20.7 nm (determined using the BET method in which the particle diameter was calculated based on the specific surface area), and a primary particle diameter with transmission electron microscope observation of 10 to 30 nm (FIG. 2). The product press molded at 300 kg/cm² from the powder had a volume resistivity of 58 Ωcm with a four-probe resistivity meter (trade name: Loresta manufactured by Mitsubishi Chemical Corporation). In addition, L, a, b and YI of the above-mentioned powder were measured with a spectroscopic color difference meter TC-1800 MK-II (manufactured by Tokyo Denshoku Co., Ltd.) and the results thereof are shown in Table 1.

Example 2

Procedures were carried out in a similar manner as those in Example 1 except that the slurry had a molar ratio $SnO_2:ZnO:Sb_2O_5$ of 0.02:0.97:1.00 when it was fed. The resulting powder showed dark blue color. The calcined powder had a specific surface area of 47.1 m²/g and a particle diameter of 20.8 nm (determined using the BET method in which the particle diameter was calculated based on the specific surface area). The product press molded at 300 kg/cm² from the powder had a volume resistivity of 58 Ωcm with a four-probe resistivity meter (trade name: Loresta manufactured by Mitsubishi Chemical Corporation). In addition, L, a, b and YI of the above-mentioned powder were measured with a spectroscopic color difference meter TC-1800 MK-II (manufactured by Tokyo Denshoku Co., Ltd.) and the results thereof are shown in Table 1.

Example 3

Procedures were carried out in a similar manner as those in Example 1 except that the slurry had a molar ratio $SnO_2:ZnO:Sb_2O_5$ of 0.10:0.97:1.00 when it was fed. The resulting powder showed dark blue color. The calcined powder had a specific surface area of 48.1 m²/g and a particle diameter of 20.1 nm (determined using the BET method in which the particle diameter was calculated based on the specific surface area). The product press molded at 300 kg/cm² from the powder had a volume resistivity of 61 Ωcm with a four-probe resistivity meter (trade name: Loresta manufactured by Mitsubishi Chemical Corporation). In addition, L, a, b and YI of the above-mentioned powder were measured with a spectroscopic color difference meter TC-1800 MK-II (manufactured by Tokyo Denshoku Co., Ltd.) and the results thereof are shown in Table 1.

Example 4

Procedures were carried out in a similar manner as those in Example 1 except that the slurry had a molar ratio $SnO_2:ZnO:Sb_2O_5$ of 0.20:0.97:1.00 when it was fed. The resulting powder showed dark green color. The calcined had a specific surface area of 46.6 m²/g and a particle diameter of 20.8 nm (determined using the BET method in which the particle diameter is calculated based on the specific surface area). The product press molded at 300 kg/cm² from the powder had a volume resistivity of 81 Ωcm with a four-probe resistivity meter (trade name: Loresta manufactured by Mitsubishi Chemical Corporation). In addition, L, a, a, b and YI of the above-mentioned powder were measured with a spectroscopic color difference meter TC-1800 MK-II manufactured by Tokyo Denshoku Co., Ltd.) and the results thereof are shown in Table 1.

Example 5

Procedures were carried out in a similar manner as those in Example 1 except that the slurry had a molar ratio $SnO_2:ZnO:Sb_2O_5$ of 0.30:0.97:1.00 when it was fed. The resulting powder showed blue-green color. The calcined powder had a specific surface area of 44.8 m²/g and a particle diameter of 21.6 nm (determined using the BET method in which the particle diameter was calculated based on the specific surface area). The product press molded at 300 kg/cm² from the powder had a volume resistivity of 105 Ωcm with a four-probe resistivity meter (trade name: Loresta manufactured by Mitsubishi Chemical Corporation). In addition, L, a, b and YI of the above-mentioned powder were measured with a spectroscopic color difference meter TC-1800 MK-II (manufactured by Tokyo Denshoku Co., Ltd.) and the results thereof are shown in Table 1.

Example 6

Procedures were carried out in a similar manner as those in Example 1 except that the slurry had a molar ratio $SnO_2:ZnO:Sb_2O_5$ of 1.00:0.97:1.00 when it was fed. The resulting powder showed green color. The calcined had a specific surface area of 46.5 m²/g and a particle diameter of 20.8 nm (determined using the BET method in which the particle diameter was calculated based on the specific surface area). The product press molded at 300 kg/cm² from the powder had a volume resistivity of 69 Ωcm with a four-probe resistivity meter (trade name: Loresta manufactured by Mitsubishi Chemical Corporation). In addition, L, a, b and YI of the above-mentioned powder were measured with a spectroscopic color difference meter TC-1800 MK-II (manufactured by Tokyo Denshoku Co., Ltd.) and the results thereof are shown in Table 1.

Example 7

After the metal oxide particle produced in Example 1 was ground in a mortar, 133 g of the ground powder, 310 g of pure water and 0.5 mmϕ glass beads were placed in a sand grinder and wet-ground for 4 hours. After wet-grinding, the glass beads were removed with 1395 g of pure water, and then the residue was passed through 700 ml of a cation exchange resin (IR-120B manufactured by Organo Corporation) and 700 ml of an anion exchange resin (IRA-410 manufactured by Organo Corporation) and then 0.62 g of diisopropylamine was added under stirring to obtain 2731 g of an aqueous sol of metal oxide particle. The resulting aqueous sol was concentrated to 397 g with a rotary evaporator. The resulting aqueous sol of metal oxide particle showed transparency and dark blue color, and had a specific gravity of 1.369, pH 6.7, a viscosity of 3.0 mPa·s, an electric conductivity of 534 μS/cm, and a solid concentration in metal oxide particle of 31.9 wt %. The sol was stable even after it was left at 50° C. for 1 month. The primary particle diameter of the sol was 10 to 30 nm with transmission electron microscope observation, 98 nm with particle diameter distribution analyzer based on laser diffractometry (trade name: Coulter N4 manufactured by Beckmann Coulter, Inc.) and the average particle diameter was 0.07 μm with a centrifugal sedimentation method (CAPA-700 manufactured by Horiba, Ltd.). The dried product of the sol had a specific surface area based on the BET method of 53.6 m²/g and a particle diameter calculated from the specific surface area of 18.1 nm.

In an egg-plant type flask, 268.5 g of the above-mentioned aqueous sol was placed, and solvent replacement was carried out by charging 3.5 liter of methanol under a reduced pressure with a rotary evaporator to obtain 208 g of a methanol sol which the metal oxide particle was dispersed in methanol. To this methanol sol, 0.1 g of diisopropylamine was added to obtain a pH-controlled methanol sol. The pH-controlled methanol sol had a specific gravity of 1.234, pH 8.82 (measured after diluting with the equal weight of water), a viscosity of 1.8 mPa·s, an electric conductivity of 122 μS/cm, and a solid concentration in metal oxide particle of 40.9 wt %. The sol was stable even after it was left at 50° C. for 1 month. The primary particle diameter of the sol was 10 to 30 nm with transmission electron microscope observation, 77 nm with particle diameter distribution analyzer based on laser diffractometry (trade name: Coulter N4 manufactured by Beckmann Coulter, Inc.) and the average particle diameter was 0.07 μm with a centrifugal sedimentation method (CAPA-700 manufactured by Horiba, Ltd.). The dried product of the sol had a specific surface area based on the BET method of 53.6 m²/g and a particle diameter calculated from the specific surface area of 18.1 nm.

After the methanol sol was diluted with methanol to 30%, the diluted methanol sol was applied on a glass plate with 0.001 inch applicator, and then measured on transmittance at wavelength of 300 to 2,000 nm with an automatic recording spectrophotometer (UV-3150PC manufactured by Shimadzu Corporation). The results are shown in FIG. 3.

Example 8

824 g of pure water was added to 376 g of the aqueous sol produced in Example 7, and the diluted sol was passed through 200 cc of an anion exchange resin (IRA-410 manufactured by Organo Corporation) and 200 cc of a cation exchange resin (IR-120B manufactured by Organo Corporation) to obtain 1225 g of an acidic sol. Under stirring, 0.18 g of diisopropylamine was added to the resulting acidic sol and then subjected to solvent replacement by charging 6 liter of methanol under a slightly reduced pressure (700 Torr) with a rotary evaporator to allow the metal oxide particle to be dispersed in the methanol. After 0.12 g of glycolic acid was added to the resulting methanol sol, the sol was subjected to solvent replacement by charging 4 liter of 2-propyl alcohol to allow the metal oxide particle to be dispersed in the 2-propyl alcohol. Ultrasonic wave was applied to the resulting 2-propyl alcohol sol for 10 minutes to obtain 2-propyl alcohol sol with high dispersion properties. The 2-propyl alcohol sol with high dispersion properties had a specific gravity of 0.96, pH 5.7 (measured after diluting with the equal weight of water), a viscosity of 3.7 mPa·s, an electric conductivity of 13 μS/cm, and a solid concentration in metal oxide particle of 20.8 wt %. The primary particle diameter of the sol was 118 nm with particle diameter distribution analyzer based on laser diffractometry (trade name: Coulter N4 manufactured by Beckmann Coulter, Inc.) and the average particle diameter was 0.05 μm with a centrifugal sedimentation method (CAPA-700 manufactured by Horiba, Ltd.).

Example 9

824 g of pure water was added to 376 g of the aqueous sol produced in Example 7, and the diluted sol was passed through 200 cc of an anion exchange resin (IRA-410 manufactured by Organo Corporation) and 200 cc of a cation exchange resin (IR-120B manufactured by Organo Corporation) to obtain 1227 g of an acidic sol. Under stirring, 0.18 g of diisopropylamine was added to the resulting acidic sol and then subjected to solvent replacement by charging 5 liter of methanol under a slightly reduced pressure (700 Torr) with a rotary evaporator to allow the metal oxide particle to be dispersed in the methanol. After 0.19 g of glycolic acid and 1.2 g of n-dodecylamine were added to the resulting methanol sol, the sol was subjected to solvent replacement by charging 2 liter of methyl ethyl ketone. After 31.5 g of 2-propylamine was added to the resulting methyl ethyl ketone sol, ultrasonic wave was applied to the sol for 10 minutes to obtain a sol in a mixed solvent of methyl ethyl ketone and 2-propyl alcohol. The resulting sol had a specific gravity of 0.97, pH 7.4 (measured after diluting with the equal weight of water), a viscosity of 2.0 mPa·s, an electric conductivity of 34 μS/cm, and a solid concentration in metal oxide particle of 20.0 wt %.

Example 10

An ultraviolet curable resin composition comprising 3.0 of dipentaerythritol hexa-acrylate (KAYARAD DPHA manufactured by Nippon Kayaku Co., Ltd.), 0.3 g of photoinitiator Irgacure 184 (manufactured by Ciba Specialty Chemicals) and 4.2 g of toluene was added to 7.5 g of the methanol sol produced in Example 7 to obtain a resin composition containing metal oxide fine particle. The resulting composition was in a good dispersed state. The composition was applied on a face of a glass plate with an applicator having a film thickness of 10 mm, and then irradiated with ultraviolet light from an ultraviolet irradiation apparatus to obtain a film with electric conductivity and heat radiation absorptivity.

The resulting film was subjected to measurements with spectroscopic color difference meter TC-1800 MK-II (manufactured by Tokyo Denshoku Co., Ltd.) and the results thereof were as follows: L=91.71, a=−1.99, b=2.34 and YI=3.23. In addition, the haze of the film was 1.3 as a result of measurements of haze with spectroscopic haze meter TC-H3DPK-MKII (manufactured by Tokyo Denshoku Co., Ltd.). The film had a surface resistivity of $8 \times 10^8$ Ω/□ with surface resistivity meter Hiresta UP (manufactured by Mitsubishi Chemical Corporation). In addition, the film was measured on transmittance at wavelength of 300 to 2,000 nm with an automatic recording spectrophotometer (UV-3150PC manufactured by Shimadzu Corporation), and the results are shown in FIG. 4.

Comparative Example 1

Procedures were carried out in a similar manner as those in Example 1 except that the slurry was composed of zinc antimonate having a molar ratio $SnO_2:ZnO:Sb_2O_5$ of 0:0.97: 1.00 when it was fed. The resulting powder showed blue-green color. The calcined powder had a specific surface area of 43.0 m²/g and a particle diameter of 22.5 nm (determined using the BET method in which the particle diameter was calculated based on the specific surface area). The product press molded at 300 kg/cm² from the powder had a volume resistivity of 106 Ωcm with a four-probe resistivity meter (trade name: Loresta manufactured by Mitsubishi Chemical Corporation). In addition, L, a, b and YI of the above-mentioned powder were measured with a spectroscopic color difference meter TC-1800 MK-II (manufactured by Tokyo Denshoku Co., Ltd.) and the results thereof are shown in Table 1.

Comparative Example 2

Procedures were carried out in a similar manner as those in Example 7 except that zinc antimonate powder produced in Comparative Example 1 was used, and a methanol sol which zinc antimonate was dispersed in methanol was obtained. The resulting methanol sol diluted with methanol to 30% was applied on a glass plate with 0.001 inch-applicator and then was measured on transmittance at wavelength of 300 to 2,000 nm with an automatic recording spectrophotometer (UV-3150PC manufactured by Shimadzu Corporation), and the results are shown in FIG. 3.

TABLE 1

|  | L | a | b | YI |
|---|---|---|---|---|
| Example 1 | 33.21 | −2.43 | −9.09 | −54.03 |
| Example 2 | 32.54 | −2.72 | −8.83 | −54.37 |
| Example 3 | 35.45 | −2.94 | −8.09 | −46.58 |
| Example 4 | 39.69 | −3.62 | −6.93 | −37.53 |
| Example 5 | 42.25 | −3.48 | −7.05 | −35.56 |
| Example 6 | 51.56 | −4.03 | −5.51 | −24.50 |
| Comparative Example 1 | 46.87 | −5.58 | −5.60 | −29.70 |

L shows a relation between white and black.
The symbol "a" means that the color of red becomes stronger in the (+) a direction and the color of green becomes stronger in the (−) direction.
The symbol "b" means that the color of yellow becomes stronger in the (+) a direction and the color of blue becomes stronger in the (−) direction.

It is preferable that among the values from color difference meter in Table 1, the value of "a" is closer to zero, the value of "b" is smaller and YI is also smaller. It is expected that calcined products having such values show strong bluish color and thereby have lower transmittance in infrared region.

It is confirmed from FIG. 1 that the glass plate on which the metal oxide particle of Example 7 was applied has lower transmittance in the infrared region compared to the glass plate on which zinc antimonate of Comparative Example 2 was applied, and therefore a higher absorptivity in the infrared region, although the former glass plate is equivalent in transparency in the visible region to the latter one.

What is claimed is:

1. A metal oxide particle comprising tin atom, zinc atom, antimony atom and oxygen atom, having a molar ratio SnO$_2$:ZnO:Sb$_2$O$_5$ of 0.01–1.00:0.80–1.20:1.00 and having a primary particle diameter of 5 to 500 nm.

2. The metal oxide particle according to claim 1, wherein the metal oxide has a rutile-type structure, and is tin oxide-doped zinc antimonate of a formula $$[(ZnO)_x(Sb_2O_5)_y]_a(SnO_2)_b$$

wherein x:y=0.80–1.20:1 and a:b=1:0.01–0.30.

3. The metal oxide particle according to claim 1, wherein the metal oxide has a rutile-type structure, and is composed of tin oxide and zinc antimonate which are represented by a formula $$[(ZnO)_x(Sb_2O_5)_y]_a(SnO_2)_b$$

wherein x:y=0.80–1.20:1 and a:b=1:0.30–1.00.

4. A process for producing the metal oxide particle according to claim 1 comprising the steps of:
   mixing a tin compound, a zinc compound and an antimony compound in a molar ratio SnO$_2$:ZnO:Sb$_2$O$_5$ of 0.01–1.00:0.80–1.20:1.00; and
   calcining the mixture at a temperature of 300 to 900° C.

5. The process according to claim 4, wherein the calcination is carried out in a gas containing water vapor.

6. A sol in which the metal oxide particle according to claim 1 is dispersed in an aqueous medium.

7. A sol in which the metal oxide particle according to claim 1 is dispersed in an organic solvent.

8. A coating composition containing the metal oxide particle according claim 1.

9. An optical member having a cured film formed by the coating composition according to claim 8 on a surface of an optical substrate.

10. A process for producing the metal oxide particle according to claim 2 comprising the steps of:
    mixing a tin compound, a zinc compound and an antimony compound in a molar ratio SnO$_2$:ZnO:Sb$_2$O$_5$ of 0.01–1.00:0.80–1.20:1.00; and calcining the mixture at a temperature of 300 to 900° C.

11. A process for producing the metal oxide particle according to claim 3 comprising the steps of:
    mixing a tin compound, a zinc compound and an antimony compound in a molar ratio SnO$_2$:ZnO:Sb$_2$O$_5$ of 0.01–1.00:0.80–1.20:1.00; and calcining the mixture at a temperature of 300 to 900° C.

12. A sol in which the metal oxide particle according to claim 2 is dispersed in an aqueous medium.

13. A sol in which the metal oxide particle according to claim 3 is dispersed in an aqueous medium.

14. A sol in which the metal oxide particle according to claim 2 is dispersed in an organic solvent.

15. A sol in which the metal oxide particle according to claims 3 is dispersed in an organic solvent.

16. A coating composition containing the metal oxide particle according to claim 2.

17. A coating composition containing the metal oxide particle according to claim 3.

* * * * *